US008353597B2

(12) United States Patent
Huang

(10) Patent No.: US 8,353,597 B2
(45) Date of Patent: Jan. 15, 2013

(54) DEVICE AND SYSTEM WHICH CONTROL A PROJECTOR BASED ON A DIGITAL MULTIPLEX PROTOCOL

(76) Inventor: Ta-Che Huang, Yonghe (TW)

( * ) Notice: Subject to any disclaimer, the term of this patent is extended or adjusted under 35 U.S.C. 154(b) by 455 days.

(21) Appl. No.: 12/773,073

(22) Filed: May 4, 2010

(65) Prior Publication Data

US 2011/0273630 A1 Nov. 10, 2011

(51) Int. Cl.
*G03B 21/26* (2006.01)
*G03B 21/14* (2006.01)

(52) U.S. Cl. .......................................... 353/30; 362/233

(58) Field of Classification Search .................... 353/30, 353/84, 87, 97, 119, 122; 362/233, 284, 362/285
See application file for complete search history.

(56) References Cited

U.S. PATENT DOCUMENTS 7,377,651 B2 * 5/2008 Belliveau ........................ 353/30
7,543,955 B2 * 6/2009 Belliveau et al. ............. 362/231
2009/0096993 A1 * 4/2009 Velazquez ....................... 353/25

* cited by examiner

*Primary Examiner* — Seung C Sohn
(74) *Attorney, Agent, or Firm* — Leong C. Lei

(57) ABSTRACT

A device and system which control a projector based on the DMX protocol includes a DMX signal receiving and processing circuit, an MCU microprocessor circuit, a DSP image processing circuit, a projection module device circuit, a DMX signal input port, a storage equipment port, an analogue video input port and a digital video input port. The DMX signal receiving and processing circuit includes the DMX signal input port, the MCU microprocessor circuit is connected with the DSP image processing circuit and the projection module device circuit, the DSP image processing circuit is connected with the storage equipment port, whereas the projection module device circuit is connected with the analogue video input port and the digital video input port. The device and system which control the projector based on the DMX protocol use standard DMX ports and are compatible with DMX ports of lighting equipment.

4 Claims, 1 Drawing Sheet

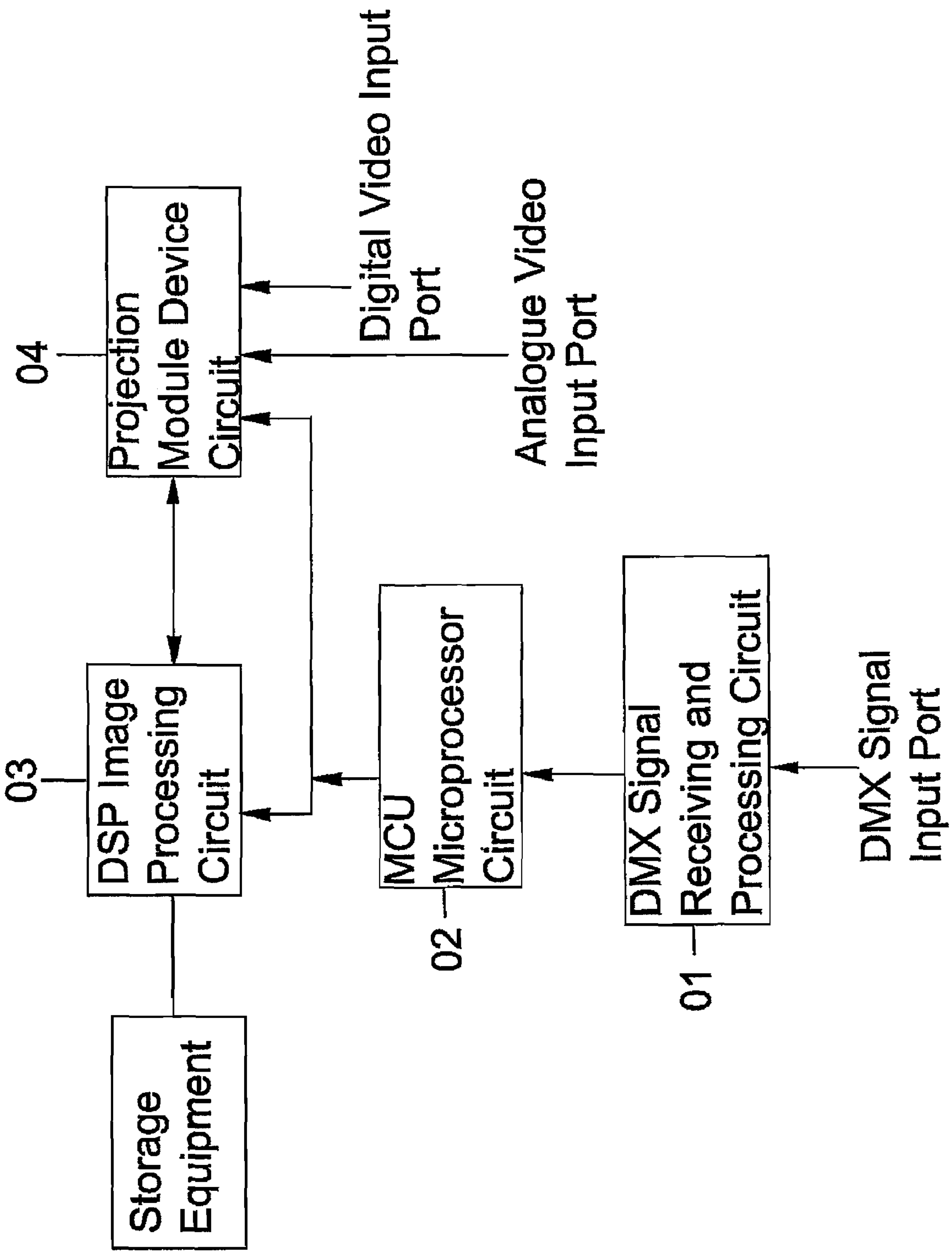
04
Projection Module Device Circuit
Digital Video Input Port
Analogue Video Input Port
03
DSP Image Processing Circuit
Storage Equipment
02
MCU Microprocessor Circuit
01
DMX Signal Receiving and Processing Circuit
DMX Signal Input Port

DEVICE AND SYSTEM WHICH CONTROL A PROJECTOR BASED ON A DIGITAL MULTIPLEX PROTOCOL

BACKGROUND OF THE INVENTION a) Field of the Invention

The present invention relates to a device and system which control a projector and more particularly to a device and system which control a projector based on the DMX (Digital Multiplex) protocol.

b) Description of the Prior Art

Nowadays, projection is used widely in places such as a family, a business, an industry, a factory or a movie theater. However, the existing projection device is only equipped with an analogue input port and a digital input port, wherein basic circuit structures thereof are an image control circuit and the projection device, with that analogue and digital signals which are inputted are first processed by the image control circuit, followed by being outputted to the projection device and projected on a screen; therefore, functions thereof are relatively simpler.

The DMX protocol has already been acknowledged and complied with by manufacturers of stage lighting equipment in the world to act as a widely used digital lighting control protocol, meaning that if each controlled fixture unit complies with this protocol, then the digital lighting control can be implemented.

A control signal of the DMX-512 or DMX-512A protocol uses a frame as the unit and each frame can drive at most 512 light loops, also called 512 DMX channels in the entertainment lighting industry. An effective DMX value of each DMX channel is between 0 and 255 and this feature of DMX allows people to implement linear modulation to the light loop by adjusting a light modulation value of DMX, such as the LED (Light Emitting Diode) lighting equipment which is more and more commonly used now. A DMX controller is a kind of device which continuously sends a DMX control signal to the controlled lighting equipment, enabling a stage lighting control engineer to design and compile a lighting control program in advance for each scene of performance, or sections of the DMX control signals. The lighting control program is then stored in each DMX controller and when the performance begins, the lighting control engineer only needs to activate the program, then the lighting equipment will follow the program (DMX signals) to show on the stage according to the previous design, which is simple and convenient in operation. This method of using the DMX protocol to implement the lighting control of the scenes has become more and more popular.

SUMMARY OF THE INVENTION

The primary object of the present invention is to provide a device and system of projection equipment based on the DMX protocol, supporting the DMX protocol to use the DMX signals to control the projection equipment, so as to solve the problem in the prior art that the projection equipment cannot collaborate well with the digital lighting equipment.

The device and system of the present invention includes a DMX signal receiving and processing circuit, an MCU (Microcontroller Unit) microprocessor circuit, a DSP (Digital Signal Processor) image processing circuit, a projection module device circuit, a DMX signal input port, a storage equipment (e.g., an SD (Secure Digital) card, a CF (Compact Flash) card, a USB (Universal Serial Bus) drive or a SATA (Serial Advanced Technology Attachment) card, but not limited to these storage equipment) port, an analogue video input port and a digital video input port.

A preferred implementation is that the DMX signal receiving and processing circuit includes the DMX signal input port.

A preferred implementation is that the MCU microprocessor circuit is connected with the DSP image processing circuit and the projection module device circuit.

A preferred implementation is that the DSP image processing circuit is connected with the storage equipment (e.g., an SD card, a CF card, a USB drive and a SATA card, but not limited to these storage equipment) port.

A preferred implementation is that the projection module device circuit is connected with the analogue video input port and the digital video input port.

The device and system which control a projector based on the DMX protocol, according to the present invention, can use the DMX signals to control the projection equipment, thereby allowing the projection equipment and digital lighting equipment to collaborate under control of the DMX signals, so as to implement an integrated performance and control.

To enable a further understanding of the said objectives and the technological methods of the invention herein, the brief description of the drawings below is followed by the detailed description of the preferred embodiments.

BRIEF DESCRIPTION OF THE DRAWINGS

FIG. 1 shows a schematic view of connection of a system of the present invention, wherein 01 represents a DMX signal receiving and processing circuit, 02 represents an MCU circuit, 03 represents a DSP image processing circuit and 04 represents a projection module device circuit.

DETAILED DESCRIPTION OF THE PREFERRED EMBODIMENTS

The present invention is a device and system which control a projector based on the DMX protocol, comprising a DMX signal receiving and processing circuit, an MCU microprocessor circuit, a DSP image processing circuit, a projection module device circuit, a DMX signal input port, a storage equipment port, an analogue video input port and a digital video input port. The DMX signal receiving and processing circuit includes the DMX signal input port, the MCU microprocessor circuit is connected with the DSP image processing circuit and the projection module device circuit, the DSP imaging processing circuit is connected with the storage equipment port, whereas the projection module device circuit is connected with the analogue video input port and the digital video input port. The system uses standard DMX ports and is compatible with DMX ports of lighting equipment. Using the DMX signals, projection equipment can be controlled, thereby allowing the projection equipment and digital lighting equipment to collaborate under control of the DMX signals, so as to implement an integrated performance and control. In addition, using the DMX signals, playing of motion pictures, playing in a 2D (2 dimension) effect, playing in a 3D (3 dimension) effect, white balance, contrast, projection correction, focusing, image anti-phase, keystone correction, horizontal correction and power on-off of the projection module device can be controlled.

The present invention discloses a technology using a device and system to control a projector with the DMX protocol. Specifically, the present invention provides a device and system which control a projector based on the DMX protocol, including image processing, video input (analogue port, digital port) and storage equipment (e.g., a CF card, an SD card or a USB drive, etc.). The said device circuits that control the projector include the DMX signal receiving and processing circuit, the MCU microprocessor circuit, the DSP image processing circuit, the projection module device circuit, the DMX signal input port, the storage equipment (e.g., an SD card, a CF card, a USB drive and a SATA card, but not limited to these storage equipment) port, the analogue video input port and the digital video input port. The devices of the present invention support the DMX protocol and can use the DMX signals for control, thereby allowing the projection equipment and the digital lighting equipment to collaborate under the control of the DMX signals.

Referring to FIG. 1, the device and system which control a projector based on the DMX protocol comprises the DMX signal receiving and processing circuit 01, the MCU microprocessor circuit 02, the DSP image processing circuit 03, the projection module device circuit 04, the DMX signal input port, the storage equipment (e.g., an SD card, a CF card, a USB drive and a SATA card, but not limited to these storage equipment) port, the analogue video input port and the digital video input port.

The DMX signal receiving and processing circuit 01 is connected with the MCU microprocessor circuit 02, wherein a DMX signal is inputted from the DMX signal input port and sent to the MCU microprocessor circuit 02 through the DMX signal receiving and processing circuit 01.

The MCU microprocessor circuit 02 is connected with the DSP image processing circuit 03 and the projection module device circuit 04. Various DMX signals can be processed by the MCU microprocessor circuit 02 and then inputted to the projection module device circuit 04 from the DSP image processing circuit 03, the analogue video input port or the digital video input port, selectively.

The projection module device circuit 04 is connected with the DSP image processing circuit 03, the analogue video input port and the digital video input port. When the projection module device reads playing messages from the DSP image processing circuit 03, the DSP image processing circuit 03 will access the corresponding contents of playing from the storage equipment, wherein the DSP image processing circuit 03 is connected with the storage equipment.

Through different DMX signals, playing of motion pictures, playing in a 2D effect, playing in a 3D effect, white balance, contrast, projection correction, focusing, image anti-phase, keystone correction, horizontal correction and power on-off, but not limited to these functions, of the projection module device can be controlled.

Accordingly, the stage lighting control engineer or a user can use the DMX signal technology to pre-configure all kinds of functions of the projection equipment, allowing the projection equipment and the digital lighting equipment to collaborate under the control of the DMX signals, so as to implement an integrated performance and control. This method of using the DMX signal to centralize the control will reduce significantly requirement of ability and an operation skill of a stage staff.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A device and system which control a projector based on the DMX (Digital Multiplex) protocol, comprising a DMX signal receiving and processing circuit, an MCU (Microcontroller Unit) microprocessor circuit, a DSP (Digital Signal Processor) image processing circuit, a projection module device circuit, a DMX signal input port, a storage equipment port, an analogue video input port and a digital video input port, wherein the DMX signal receiving and processing circuit includes the DMX signal input port, the MCU microprocessor circuit is connected with the DSP image processing circuit and the projection module device circuit, the DSP image processing circuit is connected with the storage equipment port, and the projection module device circuit is connected with the analogue video input port and the digital video input port.

2. The device and system which control a projector based on the DMX protocol, according to claim 1, wherein the system uses standard DMX ports and is compatible with DMX ports of lighting equipment.

3. The device and system which control a projector based on the DMX protocol, according to claim 1, wherein the DMX signals are used to control projection equipment, enabling the projection equipment and digital lighting equipment to collaborate under control of the DMX signals, so as to implement an integrated performance and control.

4. The device and system which control a projector based on the DMX protocol, according to claim 1, wherein using DMX signals, playing of motion pictures, playing in a 2D (2 dimension) effect, playing in a 3D (3 dimension) effect, white balance, contrast, correction of projection, focusing, image anti-phase, keystone correction, horizontal correction and power on-off of the projection module device are controlled.

* * * * *